(12) United States Patent
Katsukawa et al.

(10) Patent No.: US 10,781,222 B2
(45) Date of Patent: *Sep. 22, 2020

(54) SURFACE TREATING AGENT INCLUDING PERFLUORO(POLY)ETHER-GROUP-CONTAINING SILANE COMPOUND

(71) Applicant: DAIKIN INDUSTRIES, LTD., Osaka-shi, Osaka (JP)

(72) Inventors: Kenichi Katsukawa, Settsu (JP); Hisashi Mitsuhashi, Settsu (JP); Tomohiro Yoshida, San Jose, CA (US); Masatoshi Nose, Settsu (JP); Takashi Namikawa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 136 days.

This patent is subject to a terminal disclaimer.

(21) Appl. No.: 15/739,915

(22) PCT Filed: Jun. 21, 2016

(86) PCT No.: PCT/JP2016/068412
§ 371 (c)(1),
(2) Date: Dec. 26, 2017

(87) PCT Pub. No.: WO2016/208587
PCT Pub. Date: Dec. 29, 2016

(65) Prior Publication Data
US 2018/0186820 A1 Jul. 5, 2018

(30) Foreign Application Priority Data

Jun. 25, 2015 (JP) .................................. 2015-127889

(51) Int. Cl.
| | | |
|---|---|---|
| C07F 7/18 | (2006.01) |
| C09K 3/18 | (2006.01) |
| C09D 5/16 | (2006.01) |
| C09D 171/00 | (2006.01) |
| C08G 65/336 | (2006.01) |
| C09D 7/40 | (2018.01) |
| C08G 65/00 | (2006.01) |
| C09D 183/08 | (2006.01) |
| C09D 183/06 | (2006.01) |
| C03C 17/30 | (2006.01) |
| C08G 77/24 | (2006.01) |
| G02B 1/113 | (2015.01) |

(52) U.S. Cl.
CPC ............ C07F 7/1804 (2013.01); C03C 17/30 (2013.01); C07F 7/18 (2013.01); C07F 7/188 (2013.01); C08G 65/007 (2013.01); C08G 65/336 (2013.01); C09D 5/16 (2013.01); C09D 7/40 (2018.01); C09D 171/00 (2013.01); C09D 183/06 (2013.01); C09D 183/08 (2013.01); C09K 3/18 (2013.01); C03C 2217/76 (2013.01); C03C 2218/151 (2013.01); C08G 77/24 (2013.01); G02B 1/113 (2013.01)

(58) Field of Classification Search
CPC ................ C03C 17/30; C03C 2217/76; C03C 2218/151; C07F 7/18; C07F 7/1804; C07F 7/188; C08G 65/007; C08G 65/336; C08G 77/24; C09D 171/00; C09D 183/06; C09D 183/08; C09D 5/16; C09D 7/40; C09K 3/18; G02B 1/113
See application file for complete search history.

(56) References Cited

U.S. PATENT DOCUMENTS

| | | |
|---|---|---|
| 6,183,872 B1 | 2/2001 | Tanaka et al. |
| 2013/0216958 A1 | 8/2013 | Tsutsui |
| 2015/0118502 A1 | 4/2015 | Mitsuhashi et al. |
| 2016/0340544 A1 | 11/2016 | Katsukawa et al. |

FOREIGN PATENT DOCUMENTS

| | | |
|---|---|---|
| JP | 10-033321 A | 2/1998 |
| JP | 2000-328231 A | 11/2000 |
| JP | 2013-170170 A | 9/2013 |
| JP | 2014-55246 A | 3/2014 |
| KR | 10-2015-0013736 A | 2/2015 |

(Continued)

OTHER PUBLICATIONS

International Preliminary Report on Patentability with translation of Written Opinion dated Jan. 4, 2018, issued by the International Bureau in corresponding International Application No. PCT/JP2016/068412.

(Continued)

*Primary Examiner* — Frances Tischler
(74) *Attorney, Agent, or Firm* — Sughrue Mion, PLLC

(57) ABSTRACT

A surface-treating agent including at least one perfluoro (poly)ether group containing silane compound of the formula (1):

$$Rf-PFPE-OCF(Z)-(CF_2)_e-(Q)_f-(CH_2C(R^1)((CH_2)_h-SiX_nR^2_{3-n}))_g-Y \quad (1)$$

wherein each of symbols is as defined herein, wherein a number average molecular weight of the perfluoro(poly) ether group containing silane compound is 3000 or more and 6000 or less, and wherein 80 mol % or more of the perfluoro(poly)ether group containing silane compound contained in the surface-treating agent is a compound wherein g is 2 or more.

33 Claims, No Drawings

(56) References Cited

FOREIGN PATENT DOCUMENTS

WO         97/07155  A1      2/1997
WO     2013/187432  A1     12/2013
WO     2015/099085  A1      7/2015

OTHER PUBLICATIONS

International Search Report for PCT/JP2016/068412 dated Sep. 6, 2016 [PCT/ISA/210].
Geoffrey Hallas et al., "Dipole Moments of Methyl- and Trifluoromethyl-substituted Methyl Benzoates", Jan. 1, 1975, pp. 1587-1590, 4 pages total.

SURFACE TREATING AGENT INCLUDING PERFLUORO(POLY)ETHER-GROUP-CONTAINING SILANE COMPOUND

CROSS REFERENCE TO RELATED APPLICATIONS

This application is a National Stage of International Application No. PCT/JP2016/068412, filed on Jun. 21, 2016, which claims priority from Japanese Patent Application No. 2015-127889, filed on Jun. 25, 2015, the contents of all of which are incorporated herein by reference in their entirety.

TECHNICAL FIELD

The present invention relates to a surface-treating agent comprising a perfluoro(poly)ether group containing silane compound. Additionally, the present invention relates to an article and the like to which the surface-treating agent is applied.

BACKGROUND ART

A certain fluorine-containing silane compound is known to be able to provide excellent water-repellency, oil-repellency, antifouling property, or the like when it is used on a surface treatment of a base material. A layer (hereinafter, referred to as a "surface-treating layer") formed from the surface-treating agent comprising a fluorine-containing silane compound is applied to various base materials such as a glass, a plastic, a fiber and a building material as a so-called functional thin film.

As such fluorine-containing silane compound, perfluoropolyether group containing silane compound which has a perfluoropolyether group in its molecular main chain and a hydrolyzable group bonding to a Si atom in its molecular terminal or its terminal portion is known. For example, Patent Literature 1 describes fluorine-containing silane compound comprising a molecular main chain having a perfluoropolyether group and a plurality of polyethylene chains having a Si atom having a hydrolyzable group in a side chain of the polyethylene chains.

PRIOR ART LITERATURE

Patent Literature

Patent Literature 1: International Publication. Number 97/7155

SUMMARY OF THE INVENTION

Problem to be Solved by the Invention

The surface-treating layer is requested for high durability to provide a base material with a desired function for a long time. The layer formed from the surface-treating agent containing the fluorine-containing silane compound as described in Patent literature 1 has been suitably used in an optical member such as glasses, a touch panel or the like which is required to have light permeability or transparency since it can exert the above functions even in form of a thin film. In particular, in these uses, the friction durability is required to be further improved.

However, a layer formed from the conventional surface-treating agent containing the fluorine-containing silane compound is no longer necessarily enough to meet the increasing demand to improve the friction durability.

An object of the present invention is to provide a novel surface-treating agent comprising perfluoro(poly)ether group containing silane compound which is able to form a layer having water-repellency, oil-repellency and antifouling property as well as high friction durability. An object of the present invention is also to provide an article to which the surface-treating agent or the like is applied.

Means to Solve the Problem

As a result of intensively studying, the inventors of the present invention have found that a surface-treating layer having more excellent friction durability is able to be formed by making the content of the perfluoro(poly)ether group containing silane compound, wherein the number of repeating units of a polyethylene chain having a Si atom in its side chain is 2 or more, 80 mol % or more in the surface-treating agent comprising the perfluoro(poly)ether group containing silane compound comprising a main molecular chain having a perfluoropolyether group and a polyethylene chain having a Si atom having a hydroxyl group a hydrolyzable group in its side chain, and the inventors reach the present invention.

According to the first aspect of the present invention, there is provided a surface-treating agent comprising at least one perfluoro(poly)ether group containing silane compound of the formula (1):

$$Rf-PFPE-OCF(Z)-(CF_2)_e-(Q)_f-(CH_2C(R^1)(CH_2)_h-SiX_nR^2_{3-n})_g-Y \quad (1)$$

wherein:
Rf is an alkyl group having 1 to 10 carbon atoms which may be substituted by one or more fluorine atoms;
PFPE is $$-(OC_4F_8)_a-(OC_3F_6)_b-(OC_2F_4)_c-(OCF_2)_d-$$

wherein, a, b, c and d are each independently an integer of 0 to 90, the sum of a, b, c and d is 1 or more, and the occurrence order of the respective repeating units in parentheses with the subscript a, b, or d is not limited in the formula;
Q is an oxygen atom or a divalent organic group;
$R^1$ is a hydrogen atom or an alkyl group having 1 to 22 carbon atoms;
$R^2$ is each independently a hydrogen atom or an inert monovalent organic group;
X is a hydroxyl group or $OR^4$;
$R^4$ is each independently at each occurrence a substituted or unsubstituted $C_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3, wherein
a number average molecular weight of the perfluoro(poly)ether group containing silane compound is 3000 or more and 6000 or less, and 80 mol % or more of the perfluoro(poly)ether group containing silane compound contained in the surface-treating agent is a compound wherein g is 2 or more.

According to the second aspect of the present invention, there is provided a pellet comprising the surface-treating agent described above.

According to the third aspect of the present invention, there is provided an article comprising a base material and a layer which is formed on a surface of the base material from the surface-treating agent described above.

According to the fourth aspect of the present invention, there is provided a process for preparing a surface-treating agent comprising a perfluoro(poly)ether group containing silane compound of the formula (1)

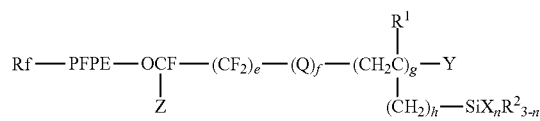
(1)

wherein:
Rf is an alkyl group having 1 to 10 carbon atoms which may be substituted by one or more fluorine atoms;
PFPE is

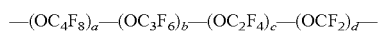
$-(OC_4F_8)_a-(OC_3F_6)_b-(OC_2F_4)_c-(OCF_2)_d-$ wherein a, b, c and d are each independently an integer of 0 to 90, the sum of a, b, c and d is at least 1, and the occurrence order of the respective repeating units in parentheses with the subscript a, b, c or d is not limited in the formula;

Q is an oxygen atom or a divalent organic group;
$R^1$ is a hydrogen atom or an alkyl group having 1 to 22 carbon atoms;
$R^2$ is each independently a hydrogen atom or an inert monovalent organic group;
X is a hydroxyl group or $OR^4$;
$R^4$ is each independently at each occurrence a substituted or unsubstituted $C_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3,
wherein a number average molecular weight of the perfluoro(poly)ether group containing silane compound is 3000 or more and 6000 or less, and 80 mol % or more of the perfluoro(poly)ether group containing silane compound contained in the surface-treating agent is a compound wherein g is 2 or more, comprising the steps of:

reacting a perfluoro(poly)ether compound of the formula (1a):

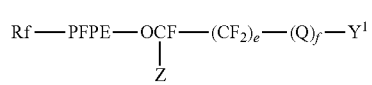
(1a)

wherein Rf, PFPE, Q, Z, e and f are as defined for the formula (1) and $Y^1$ is chlorine, iodine or bromine, with a reactive double bond containing silane compound of the formula (1b):

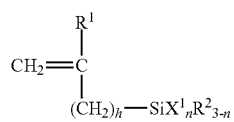
(1b)

wherein $R^1$, $R^2$, h and n are as defined for the formula (1), and $X^1$ is a hydroxyl group, a hydrolyzable group or a halogen atom
in a fluorine containing aromatic compound,
and then, optionally following steps (a) and/or (b):
(a) when Y and $Y^1$ are different, converting $Y^1$ to Y; and
(b) when X and $X^1$ are different, converting $X^1$ to X.

Effect of the Invention

According to the present invention, there is provided a novel surface-treating agent comprising a perfluoro(poly)ether group containing silane compound. By using such surface-treating agent, the surface-treating layer having water-repellency, oil-repellency and antifouling property as well as excellent friction durability can be formed.

EMBODIMENTS TO CARRY OUT THE INVENTION

Hereinafter, the composition of the present invention will be described.

The surface-treating agent of the present invention can provide a base material with water-repellency, oil-repellency, antifouling property, waterproof property and friction durability, and can be suitably used as an antifouling-coating agent or a waterproof-coating agent, although the present invention is not particularly limited thereto.

The surface-treating agent of the present invention comprises at least one perfluoro(poly)ether group containing silane compound of the formula (1).

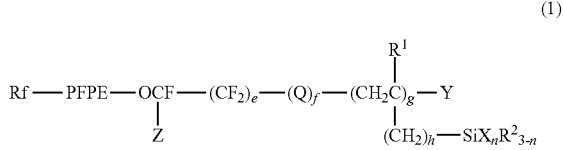
(1)

In the above formula (1), Rf is an alkyl group having 1 to 10 carbon atoms which may be substituted by one or more fluorine atoms.

The "alkyl group having 1 to 10 carbon atoms" in the alkyl group having 1 to 10 carbon atoms which may be substituted by one or more fluorine atoms is a straight or branched alkyl group having 1-10 carbon atoms, preferably a straight or branched alkyl group having 1-3 carbon atoms, more preferably a straight alkyl group having 1-3 carbon atoms.

The above-described Rf is preferably an alkyl group having 1 to 10 carbon atoms which is substituted by one or more fluorine atoms, more preferably a perfluoroalkyl group having 1 to 10 carbon atoms or $CF_2H$—$C_{1-9}$ perfluoroalkylene group, more preferably a perfluoroalkyl group having 1 to 10 carbon atoms.

The perfluoroalkyl group having 1 to 10 carbon atoms is a straight or branched perfluoroalkyl group having 1-10 carbon atoms, preferably a straight or branched perfluoroalkyl group having 1-3 carbon atoms, more preferably a straight perfluoroalkyl group having 1-3 carbon atoms, specifically —$CF_3$, —$CF_2CF_3$ or —$CF_2CF_2CF_3$.

In the above-described formula (1), PFPE is —$(OC_4F_8)_a$—$(OC_3F_6)_b$—$(OC_2F_4)_c$—$(OCF_2)_d$—, and corresponds to a perfluoro(poly)ether group. Herein, a, b, c and d are each independently 0 or an integer of 1 or more and the sum of a, b, c and d is 1 or more. Preferably, a, b, c and d are each independently an integer of 0 or more and 90 or less, for example an integer of 1 to 90, more preferably each independently an integer of 0 or more and 80 or less. Preferably, the sum of a, b, c and d is 5 or more, more preferably 10 or more, for example 10 or more and 80 or less. The occurrence order of the respective repeating units in parentheses with the subscript a, b, c or d is not limited in the formula. Among these repeating units, the —$(OC_4F_8)$— group may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, preferably —$(OCF_2CF_2CF_2CF_2)$—. The —$(OC_3F_6)$— group may be any of —$(OCF_2CF_2CF_2)$—, —$(OCF(CF_3)CF_2)$— and —$(OCF_2CF(CF_3))$—, preferably —$(OCF_2CF_2CF_2)$—. The —$(OC_2F_4)$— group may be any of —$(OCF_2CF_2)$— and —$(OCF(CF_3))$—, preferably —$(OCF_2CF_2)$—.

In one embodiment, PFPE is —$(OC_3F_6)_b$— wherein b is an integer of 1 or more and 40 or less, preferably 5 or more and 40 or less, more preferably 10 or more and 40 or less, preferably —$(OCF_2CF_2CF_2)_b$— wherein b is an integer of 1 or more and 40 or less, preferably 5 or more and 40 or less, more preferably 10 or more and 40 or less.

In another embodiment, PFPE is —$(OC_4F_8)_a$—$(OC_3F_8)_b$—$(OC_2F_4)_c$—$(OCF_2)_d$— wherein a and b are each independently an integer of 0 or more and 30 or less, and c and d are each independently an integer of 1 or more and 90 or less, preferably 5 or more and 90 or less, more preferably 10 or more and 90 or less. The occurrence order of the respective repeating units in parentheses with the subscript a, b, c or d is not limited in the formula. Preferably, PFPE is —$(OCF_2CF_2CF_2CF_2)_a$—$(OCF_2CF_2CF_2)_b$—$(OCF_2CF_2)_c$—$(OCF_2)_d$—.

In further another embodiment, PFPE is a group of —$(OC_2F_4$—$R^{11})_{n'}$—. In the formula, $R^{11}$ is a group selected from $OC_2F_4$, $OC_3F_6$ and $OC_4F_8$, or a combination of 2 or 3 groups independently selected from these groups. The combination of 2 or 3 groups independently selected from $OC_2F_4$, $OC_3F_6$ and $OC_4F_6$ includes, but are not particularly limited to, for example —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, —$OC_4F_8OC_2F_4OC_2F_4$—, and the like. The above-described n" is an integer of 2 to 90, preferably an integer of 2 to 50. In the formula, $OC_2F_4$, $OC_3F_6$ and $OC_4F_6$ may be straight or branched, preferably straight. In this embodiment, PFPE is preferably —$(OC_2F_4$—$OC_3F_6)_{n''}$— or —$(OC_2F_4$—$OC_4F_8)_{n''}$—.

In the above-described formula (1), Q is an oxygen atom or a divalent organic group.

The above-described "divalent organic group" as used herein represents a divalent group containing a carbon. Examples of the divalent organic group include, but are not particularly limited to, a divalent group obtained by removing further one hydrogen atom from a hydrocarbon group.

The above-described "hydrocarbon group" as used herein represents a group containing a carbon atom and a hydrogen atom. Examples of the hydrocarbon group include, but are not particularly limited to, a hydrocarbon group having 1-20 carbon atoms which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its terminal or in its molecular chain.

Examples of the substituent of the above-described "hydrocarbon group" include, but are not particularly limited to, for example a halogen atom such as a fluorine atom, a chlorine atom, a bromine atom or an iodine atom, preferably a fluorine atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like which may be substituted by one or more halogen atoms.

In one embodiment, Q may be a $C_{1-20}$ alkylene group or —$(CH_2)_s$-Q'-$(CH_2)_t$—. In the formula, Q' is —O—, or —$(Si(R^3)_2O)_l$— or —O—$(CH_2)_m$—$(Si(R^3)_2)_l$— (wherein $R^3$ is each independently at each occurrence a $C_{1-6}$ alkyl group, l is an integer of 1 to 100, m is an integer of 1 to 20), preferably —O—. s is an integer of 1 to 20, preferably an integer from 1 to 3, more preferably 1 or 2. t is an integer of 1 to 20, preferably an integer of 2 to 3. These groups may be substituted by one or more substituents selected from a fluorine atom and a $C_{1-3}$ alkyl group.

In another embodiment, Q may be —$(R^{20})_{m'}$—$O_{n'}$—. In the formula, $R^{20}$ is each independently at each occurrence a $C_{1-20}$ alkylene group which may be substituted by one or more fluorine atoms, preferably a $C_{1-10}$ alkylene group which may be substituted by one or more fluorine atoms, more preferably a $C_1$, alkylene group which may be substituted by one or more fluorine atoms. Examples of $R^{20}$ include, for example, —$CH_2$—, —CHF—, —$CF_2$—, —CH($CF_3$)—, —CF($CF_3$)—, —CH($CH_3$)—, —CF($CH_3$)—, and the like. In the formula, m' is an integer of 1 to 20, preferably 1 to 10. In the formula, n' is an integer from 1 to 10, preferably 1 to 5, preferably 1 to 3. It is noted that the occurrence order of the respective repeating units in parentheses with the subscript m' or n' is not limited in the formula.

Specific examples of Q include, for example:
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—, —CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
and the like.

In the above-described formula (1), $R^1$ is a hydrogen atom or an alkyl group having 1 to 22 carbon atoms. The alkyl group having 1 to 22 carbon atoms may be preferably a straight or branched alkyl group having 1 to 3 carbon atoms.

In the above-described formula (1), $R^2$ is a group binding to Si, and is each independently a hydrogen atom or an inert monovalent organic group.

The "inert monovalent organic group" is a group in which a bonding to Si is substantially not cleaved by hydrolysis. It may be, but not limited to, for example an alkyl group having 1 to 22 carbon atoms, preferably an alkyl group having 1 to 3 carbon atoms.

In the above-described formula (1), X is a group bonding to Si, and is a hydroxyl group or $OR^4$. The hydroxyl group may be, but is not particularly limited to, a group generated by hydrolysis of $OR^4$.

$R^4$ is each independently at each occurrence a substituted or unsubstituted $C_{1-12}$ alkyl group.

X is preferably a hydroxyl group, —O($R^4$) (wherein $R^4$ is a $C_{1-12}$ alkyl group, preferably a $C_{1-6}$ alkyl group, more preferably a $C_{1-3}$ alkyl group), more preferably, —OCH$_3$, —OCH$_2$CH$_3$, or —OCH(CH$_3$)$_2$. These groups may be substituted by one or more substituents selected from, for example, a fluorine atom, a $C_{1-6}$ alkyl group, a $C_{2-6}$ alkenyl group, and a $C_{2-6}$ alkynyl group.

In the above-described formula (1), Y is a hydrogen atom or a halogen atom. The halogen atom is preferably an iodine atom, a chlorine atom, a bromine atom, further preferably an iodine atom.

In the above-described formula (1), Z is a fluorine atom or a fluoroalkyl group having 1 to 5 carbon atoms. The fluoroalkyl group having 1 to 5 carbon atoms is, for example, a fluoroalkyl group having 1 to 3 carbon atoms, preferably a perfluoroalkyl group having 1 to 3 carbon atoms, more preferably a trifluoromethyl group or a pentafluoroethyl group, further preferably a trifluoromethyl group.

In the above-described formula (1), e is an integer from 0 to 3. In another embodiment, e is an integer from 1 to 3.

In the above-described formula (1), f is 0 or 1.

In the above-described formula (1), h is an integer from 0 to 3.

In the above-described formula (1), n is an integer from 1 to 3.

In the above-described formula (1), g is an integer from 1 to 10. Preferably, g is an integer of 2 to 6.

Eighty mol % or more, preferably 90 mol % or more of the perfluoro(poly)ether group containing silane compound contained in the surface-treating agent of the present invention is a compound wherein g (i.e., the number of the repeating units of a silane containing group) is 2 or more, preferably 2 or more and 6 or less.

In one embodiment, 60 mol % or more, preferably 70 mol % or more, more preferably 75 mol % or more of the perfluoro(poly)ether group containing silane compound contained in the surface-treating agent of the present invention is a compound wherein g is 2 or more and 4 or less.

In a preferable embodiment, 50 mol % or more, preferably 60 mol % or more, more preferably 70 mol % or more, further preferably 80 mol % or more of the perfluoro(poly)ether group containing silane compound contained in the surface-treating agent of the present invention is a compound wherein g is 3 or more, preferably 3 or more and 6 or less.

In one embodiment, 30 mol % or more, preferably 50 mol % or more, more preferably 65 mol % or more of the perfluoro(poly)ether group containing silane compound contained in the surface-treating agent of the present invention is a compound wherein g is 3 or more and 4 or less.

In a preferable embodiment, in the perfluoro(poly)ether group containing silane compound contained in the surface-treating agent of the present invention, an average (number average) of "g" is 2.0 or more, preferably 2.6 or more, more preferably 3.0 or more. The upper limit of the average of "g" may be, but not particularly limited to, for example, 6.0 or less or 5.0 or less.

In a further preferable embodiment, in the perfluoro(poly)ether group containing silane compound contained in the surface-treating agent of the present invention, polydispersity of "g" is more than 1.0 and less than 2.0, preferably more than 1.0 and less than 1.5, more preferably more than 1.0 and less than 1.3.

The "polydispersity of g" in the perfluoro(poly)ether group containing silane compound contained in the surface-treating agent means a proportion of "a weight average of g" to "a number average of g" (i.e., the weight average of g/the number average of g) in the perfluoro(poly)ether group containing silane compound contained in the surface-treating agent.

The "number average of g" can be calculated by the following equation (a), and the "weight average of g" can be calculated by the following equation (b):

$$\Sigma(g_i N_i)/\Sigma N_i \quad \text{Equation (a):}$$

$$\Sigma(g_i^2 N_i)/\Sigma(g_i N_i) \quad \text{Equation (b):}$$

wherein, i is an integer of 1 or more, $g_i$, is a value of g when the number of the repeating units of the silane-containing group is i, and $N_i$ is the number of the compounds when the number of the repeating units of the silane-containing group is i.

The number of the repeating units of the silane-containing group in the perfluoro(poly)ether group containing silane compound, and the number of the perfluoro(poly)ether group containing silane compound for each of the number of the repeating units can be measured by using Matrix-assisted laser desorption time-of-flight mass spectrometry (MALDI-TOF-MS).

When the number of the respective repeating units of the perfluoropolyether (PFPE) (a, b, c, and d) and the number of the silane units (g) are measured by using Matrix-assisted laser desorption time-of-flight mass spectrometry (MALDI-TOF-MS), after adding a cationizing agent (an ionizing agent) and/or a matrix at an arbitrary ratio to the compound of the formula (1), the measurement is conducted.

The mixing ratio of the cationizing agent and/or the matrix is preferably, 0 part by mass or more and 1 part by mass or less, more preferably 0 part by mass or more and 0.1 parts by mass or less with respect to 100 parts by mass of the compound of the formula (1), respectively.

The cationizing agent (the ionizing agent) is not limited as long as it can effectively ionize the compound of the formula (1), and may be a liquid or a solid. Examples of the cationizing agent include, for example, sodium chloride, potassium chloride, sodium iodide, potassium iodide, lithium trifluoroacetate, sodium trifluoroacetate, potassium trifluoroacetate and silver trifluoroacetate. More preferably, sodium iodide, sodium trifluoroacetate, or silver trifluoroacetate is used.

The matrix is not limited as long as it achieves elimination and ionization of a molecular to be analyzed which coexists with it by absorbing a light energy of a laser, and may be a liquid or a solid. Examples of the matrix include, for example, 1,8-diaminonaphthalene (1,8-DAN), 2,5-dihydroxybenzoic acid (hereinafter, sometimes abbreviated as "DHB"), 1,8-anthracene dicarboxylic acid dimethyl ester, leucoquinizarin, anthrarobin, 1,5-aminonaphthalene (1,5-DAN), 6-aza-2-thiothymine, 1,5-aminoanthraquinone, 1,6-diaminopyrene, 3,6-diaminocarbazole, 1,8-anthracene dicarboxylic acid, norharman, 1-pyrene propylamine hydrochloride, 9-aminofluorene hydrochloride, ferulic acid, dithranol (DIT), 2-(4-hydroxyphenylazo)benzoic acid (HABA), trans-2-[3-(4-tert-butylphenyl)-2-methyl-2-propenylidene]malononitrile (DCTB), trans-4-phenyl-3-butene-2-one (TPBO), trans-3-indole acrylic acid (IAA), 1,10-phenanthroline, 5-nitro-1,10-phenanthroline, α-cyano-4-hydroxy cinnamic acid (CHCA), sinapinic acid (SA), 2,4,6-trihydroxy acetophenone (THAP), 3-hydroxy picolinic acid (HPA), anthranilic acid, nicotinic acid, 3-aminoquinoline, 2-hydroxy-5-methoxybenzoic acid, 2,5-dimethoxybenzoic acid, 4,7-phenanthroline, p-coumaric acid, 1-iso-quinolinol, 2-picolinic acid, 1-pyrenebutyric acid hydrazide (PBH), 1-pyrenebutyric acid (PBA), 1-pyrenemethylamine hydrochloride (PMA), 3-AC (aminoquinoline)-CHCA, pentafluorobenzoic acid, and penta-fluorocinnamic acid. More preferably, IAA, DIT, DHB, CHCA, or 2-hydroxy-5-methoxybenzoic acid is used.

The perfluoro(poly)ether group containing silane compound of the formula (1) of the present invention has a number average molecular weight of 3000 or more and 6000 or less. The perfluoro(poly)ether group containing silane compound has a number average molecular weight of preferably 3,000-5,500, more preferably 3,000-5,000, further preferably 3,000-4,500. By setting the number average molecular weight to less than 6,000, a reaction time for synthesizing the compound can be reduced, and the solubility of the compound becomes higher, thus it becomes easier to apply the compound by a wet coating method. It is noted that the "average molecular weight" in the present invention means a number average molecular weight, and the "average molecular weight" is defined as a value measured by using $^{19}$F-NMR.

Next, a process for preparing the perfluoro(poly)ether group containing silane compound contained in the surface-treating agent of the present invention will be described.

The compound of the formula (1):

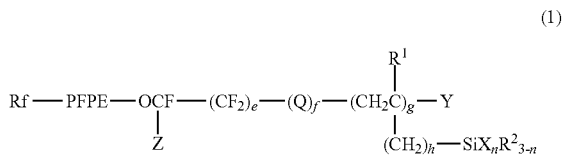

wherein:
Rf is an alkyl group having 1 to 10 carbon atoms which may be substituted by one or more fluorine atoms;
PFPE is

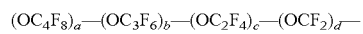

wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
$R^2$ is each independently a hydrogen atom or an inert monovalent organic group;
X is a hydroxyl group or $OR^4$;
$R^4$ is each independently at each occurrence a substituted or unsubstituted $C_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3,
comprised in the surface-treating agent of the present invention can be prepared by reacting a perfluoro(poly)ether compound of the formula (1a):

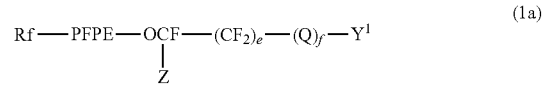

wherein Rf, PFPE, Q, Z, e and f are as defined for the formula (1) and $Y^1$ is a chlorine, an iodine or a bromine, preferably an iodine,
with a reactive double bond containing silane compound of the formula (1b):

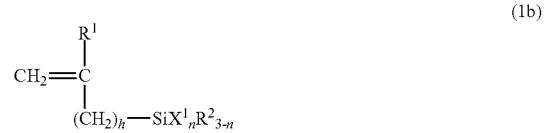

wherein $R^1$, $R^2$, h and n are as defined for the formula (1), and $X^1$ is a hydroxyl group, a hydrolyzable group or a halogen atom (for example, a chlorine, an iodine or a bromine, preferably a chlorine), and then, optionally conducting following steps (a) and/or (b):

(a) when Y and Y¹ are different, converting Y¹ to Y; and
(b) when X and X¹ are different, converting X¹ to X. The order of the steps (a) and (b) is not particularly limited, and both steps may be simultaneously conducted.

The reaction as described above is, for example, described in JP 01-294709 A.

In the perfluoro(poly)ether group containing silane compound of the formula (1) obtained as described above, when the compound wherein g is 2 or more is less than a predetermined percentage, an adjustment can be conducted by various methods so that the compound wherein g is 2 or more is not less than the predetermined percentage. For example, g can be adjusted to 2 or more by further reacting the compound of the formula (1) wherein Y is a halogen obtained in the above step with the compound of the formula (1b).

In a preferable embodiment, the reaction of the compound of the formula (1a) with the compound of the formula (1b) is conducted in a fluorine containing aromatic compound.

Examples of the fluorine containing aromatic compound include, but are not particularly limited to, for example, perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3-fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, 4-trifluoromethyl benzonitrile, aminobenzotrifluoride, and trifluoromethylaniline.

Preferably fluorine containing aromatic compound is perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3-fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, or 4-trifluoromethyl benzonitrile.

More preferable fluorine containing aromatic compound is a fluorine containing aromatic compound wherein polarizability is 0 debye or more and 3 debyes or less, in particular more than 0 debye and 3 debyes or less.

Examples of the fluorine containing aromatic compound wherein the polarizability is 0 debye or more and 3 debyes or less include, but are not particularly limited to, for example, benzotrifluoride, difluorobenzonitrile, and bistrifluoromethyl benzonitrile.

The fluorine containing aromatic compound is a fluorine containing aromatic compound having a boiling point of preferably 120° C. or more, more preferably 150° C. or more, further preferably 180° C. or more. Examples of the fluorine containing aromatic compound include difluorobenzonitrile, bistrifluoromethyl benzonitrile, particularly preferably bistrifluoromethyl benzonitrile.

In a preferable embodiment, the reaction of the compound of the formula (1a) with the compound of the formula (1b) can be generally conducted at −20 to +150° C., preferably 130 to 180° C., more preferably 140 to 180° C., under an ambient pressure or in a nitrogen stream, in the presence of an initiator or light. As the initiator, for example, a radical generating agent such as a fluorine-containing diacyl peroxide, IPP (diisopropyl peroxydicarbonate), AIBN (azobisisobutyronitrile), DTBP (di-t-butyl peroxide) is used.

In a preferable embodiment, the step (a) and the step (b) are conducted in the presence of at least one catalyst selected from zinc and tin.

In a preferable embodiment, the present invention provides a process for preparing a perfluoro(poly)ether group containing silane compound of the formula (1'):

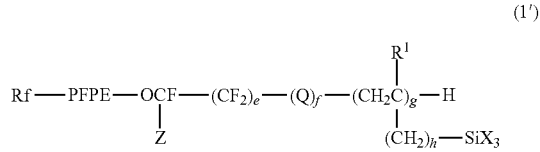

(1')

wherein:
Rf is an alkyl group having 1 to 10 carbon atoms which may be substituted by one or more fluorine atoms;
PFPE is $(OC_4F_8)_a\text{—}(OC_3F_6)_b\text{—}(OC_2F_4)_c\text{—}(OCF_2)_d\text{—}$ wherein, a, b, c and d are each independently an integer of 0 to 200, the sum of a, b, c and d is at least 1, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
X is a hydroxyl group or a hydrolyzable group;
Z is a fluorine atom or a fluoroalkyl group having 1 to 5 carbon atoms;
e is an integer from 0 to 3;
f is 0 or 1;
g is an integer from 1 to 10; and
h is an integer from 0 to 3;

which comprises the steps of:

reacting a perfluoro (poly) ether compound of the formula (1a):

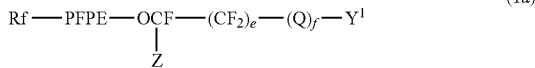

wherein Rf, PFPE, Q, Z, e and f are as defined above, and $Y^1$ is a chlorine, an iodine or a bromine, with a compound of the formula (1c):

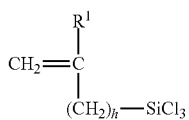

wherein $R^1$ and h are as defined above, in a fluorine containing aromatic compound, preferably at −20 to +150° C. under an ambient pressure or in a nitrogen stream, in the presence of an initiator (for example, a radical generating agent such as a fluorine-containing diacyl peroxide, IPP (diisopropyl peroxydicarbonate), AIBN (azobisisobutyronitrile), DTBP (di-t-butyl peroxide)) or light to obtain a compound of the formula (1d):

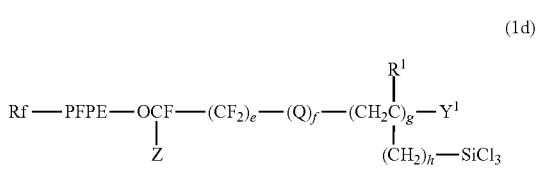

wherein Rf, PFPE, Q, $Y^1$, Z, $R^1$, e, f, g and h are as defined above, and then reacting the obtained compound with a compound of HX wherein X is as defined above in the presence of at least one catalyst selected from zinc and tin.

Examples of the fluorine containing aromatic compound includes the same compounds as the fluorine containing aromatic compounds described above. In particular, it is preferably the fluorine containing aromatic compound wherein the polarizability is 0 debye or more and 3 debyes or less, preferably more than 0 debye and 3 debyes or less. Particular preferably, m-xylene hexafluoride is used.

According to the above embodiment, the perfluoro(poly)ether group containing silane compound containing 80 mol % or more, preferably 90 mol % or more of a compound wherein g is 2 or more, and having polydispersity of more than 1.0 and not more than 2.0 can be obtained.

Although the present invention is not bound to any theory, it is presumed that by conducting the reaction in the fluorine containing aromatic compound, the solubility of a vinyl silane monomer in a solvent is increased and an addition reaction of the vinyl silane monomer is facilitated, as a result, the repeating number of the ethylene chain having a Si atom in its side chain is increased.

Hereinbefore, the process for preparation of the perfluoro(poly)ether group containing silane compound comprised in the surface-treating agent of the present invention is described. However, the process for preparation of the compound is not limited thereto, and can be prepared by using various methods.

The present invention also provides the surface-treating agent comprising the compound prepared by using the process for preparation described above.

Specifically, the present invention provides a surface-treating agent comprising at least one perfluoro(poly)ether group containing silane compound of the formula (1):

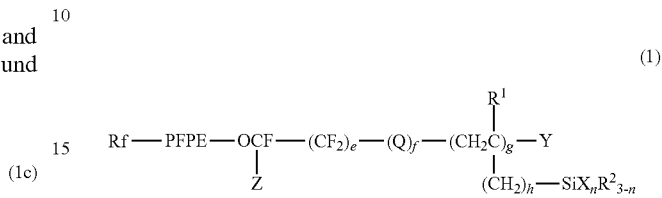

wherein:
Rf is an alkyl group having 1 to 10 carbon atoms which may be substituted by one or more fluorine atoms;
PFPE is

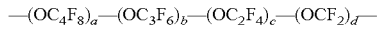

wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
$R^2$ is each independently a hydrogen atom or an inert monovalent organic group;
X is a hydroxyl group or $OR^4$;
$R^4$ is each independently at each occurrence a substituted or unsubstituted $C_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3,
wherein the perfluoro(poly)ether group containing silane compound of the formula (1) is prepared by reacting a perfluoro(poly)ether compound of the formula (1a):

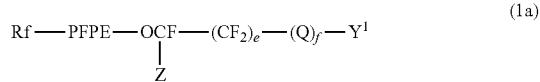

wherein Rf, PFPE, Q, Z, e and f are as defined for the formula (1) and $Y^1$ is a chlorine, an iodine or a bromine,
with a reactive double bond containing silane compound of the formula (1b):

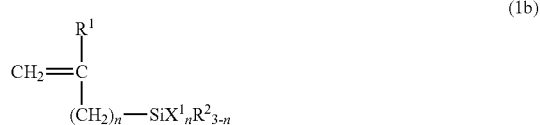

wherein R$^1$, R$^2$, h and n are as defined for the formula (1), and X$^1$ is a hydroxyl group, a hydrolyzable group or a halogen atom,
in a fluorine containing aromatic compound, preferably at −20 to +150° C. under an ambient pressure or in a nitrogen stream, in the presence of an initiator (for example, a radical generating agent such as a fluorine-containing diacyl peroxide, IPP, AIBN, DTBP) or light, and then, optionally conducting following steps (a) and/or (b):
(a) when Y and Y$^1$ are different, converting Y$^1$ to Y; and
(b) when X and X$^1$ are different, converting X$^1$ to X.

In a preferable embodiment, the present invention provides a surface-treating agent comprising at least one perfluoro(poly)ether group containing silane compound of the formula (1'):

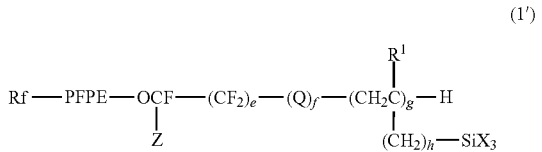
(1')

wherein:
Rf is an alkyl group having 1 to 10 carbon atoms which may be substituted by one or more fluorine atoms;
PFPE is

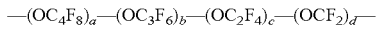

wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
R$^1$ is a hydrogen atom or an alkyl group having 1 to 22 carbon atoms;
X is a hydroxyl group or OR$^4$;
R$^4$ is each independently at each occurrence a substituted or unsubstituted C$_{1-12}$ alkyl group;
Z is a fluorine atom or a fluoroalkyl group having 1 to 5 carbon atoms;
e is an integer from 0 to 3;
f is 0 or 1;
g is an integer from 1 to 10; and
h is an integer from 0 to 3;
wherein the perfluoro(poly)ether group containing silane compound of the formula (1') is prepared by reacting a perfluoro(poly)ether compound of the formula (1a):

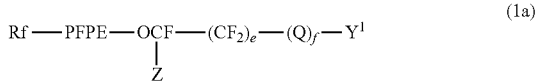
(1a)

wherein Rf, PFPE, Q, Z, e and f are as defined above, and Y$^1$ is a chlorine, an iodine or a bromine, with a compound of the formula (1c):

(1c)

wherein R$^1$ and h are as defined above, in a fluorine containing aromatic compound, preferably at −20 to +150° C. under an ambient pressure or in a nitrogen stream, in the presence of an initiator (for example, a radical generating agent such as a fluorine-containing diacyl peroxide, IPP, AIBN, DTBP) or light to obtain a compound of the formula (1d):

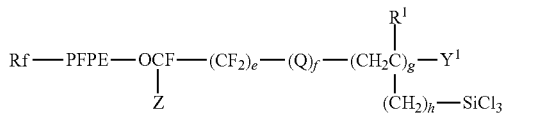
(1d)

wherein Rf, PFPE, Q, Y$^1$, Z, R$^1$, e, f, g and h are as defined above, and then
reacting the obtained compound with a compound of HX wherein X is as defined above in the presence of at least one catalyst selected from zinc and tin.

The surface-treating agent of the present invention may comprise a solvent in addition to the compound of the formula (1).

As the solvent described above, in view of stability of the surface-treating agent of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether (C$_3$F$_7$OCH$_3$), perfluorobutyl methyl ether (C$_4$F$_9$OCH$_3$), perfluorobutyl ethyl ether (C$_4$F$_9$OC$_2$H$_5$), and perfluorohexyl methyl ether (C$_2$F$_5$CF(OCH$_3$)C$_3$F$_7$) (the perfluoroalkyl group and the alkyl group may be liner or branched)), or the like. These solvents may be used alone or as a mixture of 2 or more compounds. Among them, the hydrofluoroether is preferable, perfluorobutyl methyl ether (C$_4$F$_9$OCH$_3$) and/or perfluorobutyl ethyl ether (C$_4$F$_9$OC$_2$H$_5$) are particularly preferable.

The surface-treating agent of the present invention may comprise other components in addition to the compound of the formula (1). Examples of the other components include, but are not particularly limited to, for example, a (non-reactive) fluoropolyether compound which may be also understood as a fluorine-containing oil, preferably a perfluoro(poly)ether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-described fluorine-containing oil include, but are not particularly limited to, for example, a compound of the following general formula (2) (a perfluoro(poly)ether compound).

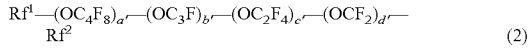
(2)

In the formula, Rf$^1$ is an alkyl group having 1-16 carbon atoms which may be substituted by one or more fluorine atoms (preferably, a perfluoroalkyl group having 1-16 carbon atoms), Rf$^2$ is an alkyl group having 1-16 carbon atoms which may be substituted by one or more fluorine atoms (preferably, a perfluoroalkyl group having 1-16 carbon atoms), a fluorine atom or a hydrogen atom, and more preferably, $Rf^1$ and $Rf^2$ are each independently a perfluoroalkyl group having 1-3 carbon atoms.

Subscripts a', b', c' and d' are the repeating number of each of four repeating units of perfluoropolyether which constitute a main backbone of the polymer, and are each independently an integer of 0 or more and 300 or less, preferably an integer of 1 or more and 100 or less, and the sum of a', b', c' and d' is at least 1, preferably 5 or more, more preferably 10 or more. The sum of a', b', c' and d' is preferably 5 or more, more preferably 10 or more, for example, 10 or more and 100 or less. The occurrence order of the respective repeating units in parentheses with the subscript a', b', c' or d' is not limited in the formulae. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

Examples of the perfluoropolyether compound of the above described general formula (2) include a compound of any of the following general formulae (2a) and (2b) (may be one compound or a mixture of two or more compounds).

$$Rf^1-(OCF_2CF_2CF_2)_{b'}-Rf^2 \quad (2a)$$

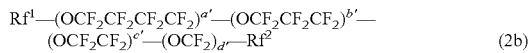

$$Rf^1-(OCF_2CF_2CF_2CF_2)_{a'}-(OCF_2CF_2CF_2)_{b'}-(OCF_2CF_2)_{c'}-(OCF_2)_{d'}-Rf^2 \quad (2b)$$

In these formulae:

$Rf^1$ and $Rf^2$ are as defined above; in the formula (2a), b' is an integer of 1 or more and 300 or less, preferably an integer of 1 or more and 100 or less; and in the formula (2b), a' and b' are each independently an integer of 0 or more and 30 or less, and c' and d' are each independently an integer of 1 or more and 300 or less. The occurrence order of the respective repeating units in parentheses with the subscript a', b', c' or d' is not limited in the formulae.

The above-described fluorine-containing oil may have an average molecular weight of 1,000-30,000. By having such average molecular weight, high surface slip property can be obtained. Additionally, when the surface-treating layer is formed from the surface-treating agent of the present invention by using deposition, the fluorine-containing oil preferably has an average molecular weight larger than an average molecular weight of the perfluoro(poly)ether group containing silane compound contained in the surface-treating agent. For example, the fluorine-containing oil may have an average molecular weight of for example 5,000 to 30,000, preferably 10,000 to 30,000.

The fluorine-containing oil may be contained in the surface-treating agent of the present invention, for example, at 0-500 parts by mass, preferably 0-400 parts by mass, more preferably 25-400 parts by mass with respect to 100 parts by mass of the perfluoro(poly)ether group containing silane compound of the present invention (as the total mass when two or more compounds are used; hereinafter the same shall apply).

The compound of the general formula (2a) and the compound of the general formula (2b) may be used alone or in combination. The compound of the general formula (2b) is preferable than the compound of the general formula (2a) since the compound of the general formula (2b) provides higher surface slip property than the compound of the general formula (2a). When they are used in combination, the mass ratio of the compound of the general formula (2a) to the compound of the general formula (2b) is preferably 1:1 to 1:30, more preferably 1:1 to 1:10. By applying such mass ratio, a surface-treating layer having a good balance of surface slip property and friction durability can be obtained.

In one embodiment, the fluorine-containing oil comprises one or more compounds of the general formula (2b). In such embodiment, the mass ratio of the compound of the formula (1) to the compound of the formula (2b) in the surface-treating agent is preferably 4:1 to 1:4.

From the other point of view, the fluorine-containing oil may be a compound of the general formula A'-F wherein A' is a $C_{5-16}$ perfluoroalkyl group. The compound of A'-F is preferable because the compound has high affinity for the compound of the formula (1) wherein Rf is a $C_{1-10}$ perfluoroalkyl group.

The fluorine-containing oil contributes to increasing of surface slip property of the surface-treating layer.

As the above-described silicone oil, for example, a liner or cyclic silicone oil having 2,000 or less siloxane bonds may be used. The liner silicone oil may be so-called a straight silicone oil and a modified silicon oil.

Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent of the present invention, for example, at 0-300 parts by mass, preferably 50-200 parts by mass with respect to 100 parts by mass of the perfluoro(poly)ether group containing silane compound of the present invention (as the total mass when two or more compounds are used; hereinafter the same shall apply).

The silicone oil contributes to increasing of surface slip property of the surface-treating layer.

Examples of the above-described catalyst contained in the surface-treating agent include an acid (for example, acetic acid, trifluoroacetic acid, etc.), a base (for example, ammonia, triethylamine, diethylamine, etc.), a transition metal (for example, Ti, Ni, Sn, etc.), and the like.

The catalyst contained in the surface-treating agent facilitates hydrolysis and dehydration-condensation of the perfluoro(poly)ether group containing silane compound of the present invention to facilitate a formation of the surface-treating layer.

Examples of the other components other than the above-described components include, for example, tetraethoxysilane, methyltrimethoxysilane, 3-aminopropyltrimethoxysilane, 3-glycidoxypropyltrimethoxysilane, methyltriacetoxysilane, and the like.

The surface-treating agent of the present invention is impregnated into a porous material, for example, a porous ceramic material, a metal fiber for example that obtained by solidifying a steel wool into a form of cotton to obtain a pellet. The pellet can be used, for example, in vacuum deposition.

Next, the article of the present invention will be described.

The article of the present invention comprises a base material and a layer (surface-treating layer) which is formed from the PFPE containing silane compound or the surface-treating agent of the present invention (hereinafter, referred to simply as "surface-treating agent" as a representative thereof) on the surface of the base material. This article can be produced, for example, as follows.

Firstly, the base material is provided. The base material usable in the present invention may be composed of any suitable material such as a glass, a resin (may be a natural or synthetic resin such as a common plastic material, and may be in form of a plate, a film, or others), a metal or a metal oxide (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone or the like.

For example, when an article to be produced is an optical member, a material constituting the surface of the base material may be a material for an optical member, for example, a glass or a transparent plastic. For example, when an article to be produced is an optical member, any layer (or film) such as a hard coating layer or an antireflection layer may be formed on the surface (outermost layer) of the base material. As the antireflection layer, either a single antireflection layer or a multi antireflection layer may be used. Examples of an inorganic material usable in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or $SiO$ are used in the outermost layer. When an article to be produced is an optical glass part for a touch panel, it may have a transparent electrode, for example, a thin layer comprising indium tin oxide (ITO), indium zinc oxide, or the like on a part of the surface of the base material (glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

The base material may be that of which at least the surface consists of a material originally having a hydroxyl group. Examples of such material include a glass, in addition, a metal on which a natural oxidized film or a thermal oxidized film is formed (in particular, a base metal), a ceramic, a semiconductor, and the like. Alternatively, as in a resin, when the hydroxyl groups are present but not sufficient, or when the hydroxyl group is originally absent, the hydroxyl group can be introduced on the surface of the base material, or the number of the hydroxyl group can be increased by subjecting the base material to any pretreatment. Examples of the pretreatment include a plasma treatment (for example, corona discharge) or an ion beam irradiation. The plasma treatment may be suitably used to introduce the hydroxyl group into or increase it on the surface of the base material, further, to clarify the surface of the base material (remove foreign materials, and the like). Alternatively, other examples of the pretreatment include a method wherein a monolayer of a surface adsorbent having a carbon-carbon unsaturated bond group is formed on the surface of the base material by using a LB method (Langmuir-Blodgett method) or a chemical adsorption method beforehand, and then, cleaving the unsaturated bond under an atmosphere of oxygen and nitrogen.

Alternatively, the base material may be that of which at least the surface consists of a material comprising other reactive group such as a silicon compound having one or more Si—H groups or alkoxysilane.

Next, the film of the above surface-treating agent of the present invention is formed on the surface of the base material, and the film is post-treated, as necessary, and thereby the surface-treating layer is formed from the surface-treating agent.

The formation of the film of the surface-treating agent of the present invention can be performed by applying the above surface-treating agent on the surface of the base material such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, chemical vaper deposition (CVD) and a similar method. The specific examples of the deposition method (usually, vacuum deposition) include resistance heating, electron beam, high-frequency heating, ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

The formation of the film is preferably performed so that the surface-treating agent of the present invention is present together with a catalyst for hydrolysis and dehydration-condensation in the coating. Simply, when the wet coating method is used, after the surface-treating agent of the present invention is diluted with a solvent, and just prior to applying it to the surface of the base material, the catalyst may be added to the diluted solution of the surface-treating agent of the present invention. When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal such as iron or copper with the surface-treating agent of the present invention to which the catalyst has been added.

As the catalyst which coexists with the surface-treating agent, any suitable acid or base can be used. As the acid catalyst, for example, acetic acid, formic acid, trifluoroacetic acid, or the like can be used. As the base catalyst, for example, ammonia, an organic amine, or the like can be used.

Next, the film is post-treated as necessary. This post-treatment is, but not limited to, a treatment in which water supplying and dry heating are sequentially performed, in more particular, may be performed as follows.

After the film of the surface-treating agent of the present invention is formed on the surface of the base material as mentioned above, water is supplied to this film (hereinafter, referred to as precursor coating). The method of supplying water may be, for example, a method using dew condensation due to the temperature difference between the precursor coating (and the base material) and ambient atmosphere or spraying of water vapor (steam), but not specifically limited thereto.

It is considered that, when water is supplied to the precursor coating, water acts on a hydrolyzable group bonding to Si present in the perfluoro(poly)ether group containing silane compound in the surface-treating agent of the present invention, thereby enabling rapid hydrolysis of the compound.

The supplying of water may be performed under an atmosphere, for example, at a temperature of zero to 500° C., preferably 100° C. or more and 300° C. or less. By supplying water at such temperature range, hydrolysis can proceed. The pressure at this time is not specifically limited but simply may be ambient pressure.

Then, the precursor coating is heated on the surface of the base material under a dry atmosphere over 60° C. The method of dry heating may be to place the precursor coating together with the base material in an atmosphere at a temperature over 60° C., preferably over 100° C., and for example, of 500° C. or less, preferably of 300° C. or less, and at unsaturated water vapor pressure, but not specifically limited thereto. The pressure at this time is not specifically limited but simply may be ambient pressure.

Under such atmosphere, between the perfluoro(poly)ether group containing silane compound of the present inventions, the groups (being hydroxyl groups when all $R^1$ are hydroxyl groups in the above mentioned compound of any of the formula (1); hereinafter the same shall apply) bonding to Si after hydrolysis are rapidly dehydration-condensed with each other. Furthermore, between the compound and the base material, the group bonding to Si in the compound after hydrolysis and a reactive group present on the surface of the base material are rapidly reacted, and when the reactive group present on the surface of the base material is a hydroxyl group, dehydration-condensation is caused. As the result, the bond between the PFPE containing silane compounds of the present invention is formed, and the bond between the compound and the base material is formed. It is noted that if present, the fluorine-containing oil and/or the silicone oil is held or acquired by an affinity to the perfluoropolyether group containing silane compound.

The above supplying of water and dry heating may be sequentially performed by using a superheated water vapor.

The superheated water vapor is a gas which is obtained by heating a saturated water vapor to a temperature over the boiling point, wherein the gas, under an ambient pressure, has become to have a unsaturated water vapor pressure by heating to a temperature over 100° C., generally of 500° C. or less, for example, of 300° C. or less, and over the boiling point. When the base material on which the precursor coating is formed is exposed to a superheated water vapor, firstly, due to the temperature difference between the superheated water vapor and the precursor coating of a relatively low temperature, dew condensation is generated on the surface of the precursor coating, thereby supplying water to the precursor coating. Presently, as the temperature difference between the superheated water vapor and the precursor coating decreases, water on the surface of the precursor coating is evaporated under the dry atmosphere of the superheated water vapor, and an amount of water on the surface of the precursor coating gradually decreases. During the amount of water on the surface of the precursor coating is decreasing, that is, during the precursor coating is under the dry atmosphere, the precursor coating on the surface of the base material contacts with the superheated water vapor, as a result, the precursor coating is heated to the temperature of the superheated water vapor (temperature over 100° C. under ambient pressure). Therefore, by using a superheated water vapor, supplying of water and dry heating are enabled to be sequentially carried out simply by exposing the base material on which the precursor coating is formed to a superheated water vapor.

As mentioned above, the post-treatment can be performed. It is noted that though the post-treatment may be performed in order to further increase friction durability, it is not essential in the producing of the article of the present invention. For example, after applying the surface-treating agent to the surface of the base material, it may be enough to only stand the base material.

As described above, the surface-treating layer derived from the film of the surface-treating agent of the present invention is formed on the surface of the base material to produce the article of the present invention. The surface-treating layer thus formed has high surface slip property and high friction durability. Furthermore, this surface-treating layer may have water-repellency, oil-repellency, antifouling property (for example, preventing from adhering a fouling such as fingerprints), waterproof property (preventing infiltration of water into electrical components, and the like), surface slip property (or lubricity, for example, wiping property of a fouling such as fingerprints and excellent tactile feeling in a finger) depending on a composition of the surface-treating agent used, in addition to high friction durability, thus may be suitably used as a functional thin film.

The article having the surface-treating layer obtained according to the present invention is not specifically limited to, but may be an optical member. Examples of the optical member include the followings: displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a front surface protective plate, an antireflection plate, a polarizing plate, or an anti-glare plate of these display, or these whose surface is subjected to antireflection treatment; lens of glasses, or the like; a touch panel sheet of an instrument such as a mobile phone or a personal digital assistance; a disk surface of an optical disk such as a Blu-ray disk, a DVD disk, a CD-R or MO; an optical fiber, and the like; a display surface of a clock.

Other article having the surface-treating layer obtained according to the present invention may be also a ceramic product, a pained surface, a cloth product, a leather product, a medical product and a plaster.

Other article having the surface-treating layer obtained according to the present invention may be also a medical equipment or a medical material.

The thickness of the surface-treating layer is not specifically limited. For the optical member, the thickness of the surface-treating layer is within the range of 1-30 nm, preferably 1-15 nm, in view of optical performance, friction durability and antifouling property.

Hereinbefore, the article produced by using the surface-treating agent of the present invention is described in detail. It is noted that an application, a method for using or a method for producing the article are not limited to the above exemplification.

EXAMPLES

The perfluoro(poly)ether group containing silane compound, the process for producing it and the surface-treating agent comprising it of the present invention will be described in detail through Examples, although the present invention is not limited to Examples. It is noted that in Examples, the occurrence order of the four repeating units $(CF_2O)$, $(CF_2CF_2O)$, $(CF_2CF_2CF_2O)$ and $(CF_2CF_2CF_2CF_2O)$ constituting the perfluoropolyether of is not limited. The formula representing the compound having a perfluoropolyether group shows an average composition.

Synthesizing Example 1: Preparation of a Perfluoropolyether Compound Having an Iodine at the Terminal To a four necked flask of 1 L provided with a reflux condenser, a thermometer and a stirrer, $CF_3CF_2CF_2O(CF_2CF_2CF_2O)_bCF_2CF_2COOH$ (an average of b=24; 180 g) and hexafluorotetrachlorobutane (100 mL) were added, and an aqueous solution of potassium hydroxide (80 mL: containing 4.87 g of potassium hydroxide) was added with stirring. The resulting solution was dried. Hexafluorotetrachlorobutane (600 mL) and iodine were further added under a nitrogen stream in this order. This mixture was heated to 200° C., and maintained to progress iodination. The inorganic salt was removed from the oil and hexafluorotetrachlorobutane was distilled off to obtain clear $CF_3CF_2CF_2O(CF_2CF_2CF_2O)_mCF_2CF_2I$ (average of m=24; 160 g).

Example 1: Preparation of a Perfluoropolyether Group Containing Silane Compound Having an Iodine at the Terminal To a four necked flask of 500 mL provided with a reflux condenser, a thermometer and a stirrer, the perfluoropolyether compound having an iodine at the terminal obtained in Synthesizing Example 1 (90 g), 3,5-bis(trifluoromethyl)benzonitrile (90 g) and vinyl trichlorosilane (10 g) were added in this order, and then di-tert-butylperoxide (2 g) was added. The mixture was heated to 145° C., and stirred at this temperature for 7 hours. Then, a volatile content was distilled off to obtain a perfluoropolyether group containing silane compound having iodine at the terminal (A) of the following (A)

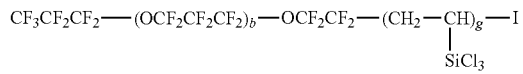

Example 2: Preparation of a Perfluoropolyether Group Containing Methoxysilane Compound To a four necked flask of 200 mL provided with a reflux condenser, a thermometer and a stirrer, the perfluoropolyether group containing silane compound having an iodine at the terminal (A) obtained in Example 1 (20 g), m-xylene hexafluoride (40 g), and zinc powder (2.3 g) were added in this order, and then methanol (5 mL) was added under a nitrogen stream at a room temperature and reacted for 3 hours. To the reaction mixture, perfluorohexane (20 g) was added, and then the mixture was washed with methanol. Then, a volatile content was distilled off under a reduced pressure to obtain a perfluoropolyether group containing methoxysilane compound having hydrogen at the terminal (B) (16 g). The number average molecular weight of the compound was measured by $^{19}$F-NMR, as a result, it was 3,920.

(B)

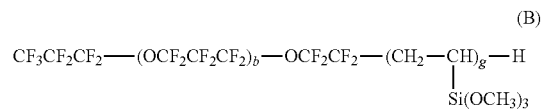

Example 3

$CF_3CF_2CF_2O(CF_2CF_2CF_2O)_bCF_2CF_2I$ (the average of b=35) was obtained similarly to Synthesizing Example except for using $CF_3CF_2CF_2O(CF_2CF_2C_2O)_bCF_2CF_2COOH$ (the average of b=35) instead of $CF_3CF_2CF_2O(CF_2CF_2CF_2O)_bCF_2CF_2COOH$ (the average of b=24). Then, the compound of the above formula (B) wherein b was 35 was obtained similarly to Examples 1 and 2 except for using this compound. The number average molecular weight of the compound was measured by $^{19}$F-NMR, as a result, it was 5,690.

Example 4: Preparation of a Perfluoropolyether Group Containing Methoxysilane Compound Having a Hydrogen at the Terminal A compound having the iodine at the terminal (91 g) was obtained similarly to Example 1 except that vinyl trimethoxysilane (9 g) was used instead of vinyl trichlorosilane. Then, to a four necked flask of 200 mL provided with a reflux condenser, a thermometer and a stirrer, the compound having an iodine at the terminal (20 g), perfluorohexane (20 g), tert-butylalcohol (20 g) and a zinc powder (1.0 g) were added in this order, and stirred at 45° C. for 7 hours. Then, the mixture was washed with tetrahydrofuran. Then, a volatile content was distilled off under a reduced pressure to obtain a perfluoropolyether group containing methoxy silane compound having hydrogen at the terminal (B) (17 g).

Example 6: Preparation of a Perfluoropolyether Group Containing Methoxysilane Compound Having an Iodine at the Terminal To a four necked flask of 500 mL provided with a reflux condenser, a thermometer and a stirrer, a perfluoropolyether compound having an iodine at the terminal (90 g) of an average composition: $CF_3(OCF_2CF_2)_{20}(OCF_2)_{16}OCF_2CH_2OCF_2CHFOCF_2CF_2I$ (proviso with, the mixture contains a slight amount of compounds comprising a slight amount of repeating units of $(CF_2CF_2CF_2CF_2O)$ and/or $(CF_2CF_2CF_2O)$), 3,5-bis(trifluoromethyl)benzonitrile (85 g), vinyl trichlorosilane (15 g), and di-tert-butyl peroxide (2.7 g) were added in this order, and heated to 145° C. and stirred for 7 hours. Then, a volatile content was distilled off to obtain a perfluoropolyether group containing silane compound having iodine at the terminal of the following formula (E) (82 g).

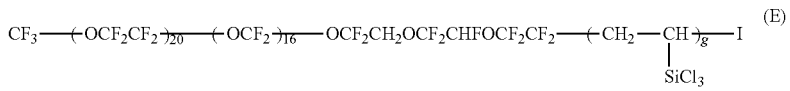

(E)

Example 6: Preparation of a Perfluoropolyether Group Containing Methoxysilane Compound Having a Hydrogen at the Terminal To a four necked flask of 200 mL provided with a reflux condenser, the perfluoropolyether group containing silane compound having an iodine at the terminal (E) (18 g) obtained in Example 5, m-xylene hexafluoride (30 g), and zinc powder (1.5 g) were added in this order, and methanol (8 mL) was added at a room temperature, and then heated to 45° C. and stirred for 7 hours. To the reaction mixture, perfluorohexane (20 g) was added, and the mixture was washed with methanol. Then, a volatile content was distilled off under a reduced pressure to obtain a perfluoropolyether group containing methoxysilane compound having a hydrogen at the terminal (F) (14 g). The number average molecular weight of the compound was measured by $^{19}$F-NMR, as a result, it was 4,000.

The number average molecular weight of the compound was measured by $^{19}$F-NMR, as a result, it was 4,000.

Evaluation

Examples 7, 8, and 9 and Comparative Example 3

With respect to compounds (B) obtained in Example 2 and Example 4, compound (F) obtained in Example 6, and compound (B') obtained in Comparative Example 1, the number of the respective perfluoropolyether (PFPE) unit (a, b, c, d) and the number of the silane unit (g) were measured (Examples 7, 8, and 9 and Comparative Example 3, respectively).

Measurement Method

With respect to compounds (B) obtained in Example 2 and Example 4, compound (F) obtained in Example 6, and

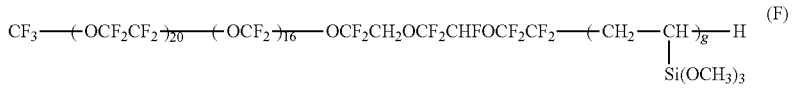

(F)

Comparative Example 1

Hexafluorotetrachlorobutane at the same amount was used instead of 3,5-bis(trifluoromethyl)benzonitrile, heated to 120° C. and stirred at this temperature overnight to obtain compound (A') of the formula (A) similarly to Example 1. Then, the procedure of Example 2 was performed to obtain compound (B') of the formula (B) (15 g). The number average molecular weight of the compound was measured by $^{19}$F-NMR, as a result, it was 4,000.

Comparative Example 2

$CF_3CF_2CF_2O(CF_2CF_2CF_2O)_bCF_2CF_2I$ (the average of b=43) was obtained similarly to Synthesizing Example except for using $CF_3CF_2CF_2O(CF_2CF_2CF_2O)_b$ $CF_2CF_2COOH$ (the average of b=43) instead of $CF_3CF_2CF_2O(CF_2CF_2CF_2O)_bCF_2CF_2COOH$ (the average of b=24). This compound was used and heated to 120° C. and stirred at this temperature overnight to obtain compound (A') of the formula (A) similarly to Example 1. Then, the procedure of Example 2 was performed to obtain compound (B') of the formula (B) wherein b is 43 (15 g).

compound (B') obtained in Comparative Example 1, solution (A) wherein each compound (5 mg) was diluted in 2 mL of perfluorobutyl ethyl ether (HFE-7200, manufactured by Sumitomo 3M Limited) and solution (B) wherein 2 mg of sodium trifluoroacetate was diluted in 1 mL of tetrahydrofuran were mixed at the ratio of 20:1 (volume ratio A:B). 0.5 μL of this solution was measured by using Matrix-assisted laser desorption time-of-flight mass spectrometry (MALDI-TOF-MS) JMS S-3000 "Spiral TOF" manufactured by JEOL Ltd. For calibration of the mass (m/z), polypropylene glycol having 1,000 of an average molecular weight was used as external standard.

The results are shown the following Table 1. It is noted that the intensity of the compound wherein g is 7 or more is below the measurement limit.

TABLE 1

| | Compound used | Number of PFPE units (average) | | | | Intensity ratio (%) for each of the number of silane units (g) | | | | | | Number average of the number of silane units | Weight average of the number of silane units | Weight average/ Number average |
|---|---|---|---|---|---|---|---|---|---|---|---|---|---|---|
| | | a | b | c | d | 1 | 2 | 3 | 4 | 5 | 6 | | | |
| Example 7 | Example 2 | 0 | 18 | 0 | 0 | 7.1 | 10.7 | 37.4 | 30.8 | 9.6 | 4.3 | 3.4 | 3.7 | 1.1 |
| Example 8 | Example 3 | 0 | 35 | 0 | 0 | 17.6 | 27.9 | 19.4 | 14.6 | 11.3 | 9.2 | 3.0 | 3.8 | 1.3 |
| Example 9 | Example 6 | 1 | 1 | 20 | 16 | 4.1 | 17.1 | 52.1 | 17.2 | 8.2 | 1.3 | 3.2 | 3.4 | 1.1 |
| Comparative Example 3 | Comparative Example 1 | 0 | 18 | 0 | 0 | 31.1 | 29.9 | 13.9 | 10.2 | 6.8 | 8.1 | 2.6 | 3.5 | 1.4 |

Intensity ratio (%) for each of the number of silane unit (g) when the sum of intensity for g is 1 to 6 was defined as 100% was calculated.

Number average of the number of silane units (number average of g): $\Sigma(g_i N_i)/\Sigma N_i$ Weight average of the number of silane units (weight average of g): $\Sigma(g_i^2 N_i)/\Sigma(g_i N_i)$ wherein i is an integer of 1 or more, $g_i$ means the value of g when the number of the repeating unit of the silane containing group is i, and $N_i$ means the number of the compound wherein the number of the repeating units of the silane-containing group is i.

Weight average/Number average (polydispersity of g): Weight average of the number of silane units/Number average of the number of silane units Preparation of a Surface-Treating Agent and Formation of a Surface-Treating Layer Example 10

The compound obtained in Example 2 was dissolved in hydrofluoroether (Novec HFE7200 manufactured by Sumitomo 3M Ltd.)) such that the concentration was 20 wt % to prepare Surface-treating agent 1.

Surface-treating agent 1 prepared in the above was vacuum deposited on a glass slide. Processing condition of the vacuum deposition was a pressure of $3.0 \times 10^{-3}$ Pa. The surface-treating agent of 2 mg was vacuum-deposited per one plate of the glass slide (55 mm×100 mm). Then, the glass slide having the deposited layer was stood at 20° C. under an ambient of humidity of 65% for 24 hours. Thereby, the deposited layer was cured and the surface-treating layer was formed.

Examples 11 and 12

The surface-treating layers were formed similarly to Example 10 except that the compound obtained in Example 3 and the compound obtained in Example 6 were used in place of the compound obtained in Example 2, respectively.

Comparative Example 4

The surface-treating agent was prepared and the surface-treating layer was formed similarly to Example 10 except that the compound obtained in Comparative Example 1 was used in place of the compound obtained in Example 2.

Evaluation of Surface Treating Layer (Evaluation of Friction Durability)

A static water contact angle of the surface-treating layers formed on the surface of the base material in the above Examples 10-12 and Comparative Example 4 respectively was measured. The static water contact angle was measured for 1 µL of water by using a contact angle measuring instrument (manufactured by KYOWA INTERFACE SCIENCE Co., Ltd.).

As an evaluation of the friction durability, a steel wool friction durability evaluation was performed. Specifically, the base material on which the surface-treating layer was formed was horizontally arranged, and then, a steel wool (grade No. 0000) was contacted with the exposed surface of the surface-treating layer and a load of 1000 gf was applied thereon. Then, the steel wool was shuttled at a rate of 140 mm/second while applying the load.

The static water contact angle (degree) was measured per 1,000 shuttling. The evaluation was stopped when the measured value of the contact angle became to be less than 100 degree. The results are shown in Table 2.

TABLE 2

| Number of rubbing (times) | Contact Angle (degree) | | | |
|---|---|---|---|---|
| | Example 10 | Example 11 | Example 12 | Comparative Example 4 |
| 0 | 115.5 | 114.3 | 115.9 | 114.0 |
| 1000 | 111.9 | 113.7 | 113.8 | 110.5 |
| 2000 | 110.9 | 113.2 | 113.7 | 109.2 |
| 3000 | 109.5 | 111.6 | 113.0 | 106.4 |
| 4000 | 108.4 | 111.0 | 112.7 | 98.8 |
| 5000 | 105.3 | 110.5 | 112.4 | — |
| 6000 | 96.5 | 109.8 | 111.8 | — |
| 7000 | — | 109.4 | 111.5 | — |
| 8000 | — | 109.2 | 110.9 | — |
| 9000 | — | 108.9 | 110.2 | — |
| 10000 | — | 108.2 | 109.2 | — |
| 11000 | — | 107.8 | 108.1 | — |
| 12000 | — | 105.3 | 107.8 | — |
| 13000 | — | 104.6 | 105.0 | — |
| 14000 | — | 103.5 | 102.4 | — |
| 15000 | — | 103.0 | 102.0 | — |
| 16000 | — | 98.4 | 97.2 | — |

As understood from Table 2, it was confirmed that Examples 10-12 using the surface-treating agent containing the perfluoropolyether group containing silane compound of the present invention showed remarkably increased friction durability in comparison with Comparative Example 4 wherein the compound wherein g is 2 or more is less than 80 mol %. In addition, it was confirmed that in the preparation of the perfluoropolyether group containing silane compound of the present invention, the addition reaction of vinyl silane could be progressed for a short time (7 hours).

INDUSTRIAL APPLICABILITY

The present invention is suitably applied for forming a surface-treating layer on a surface of various base materials, in particular, an optical member in which transparency is required.

The invention claimed is:

1. A surface-treating agent comprising at least one perfluoro(poly)ether group containing silane compound of the formula (1):

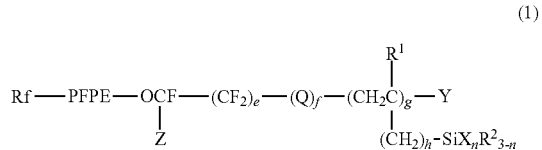

wherein:
Rf is an alkyl group having 1 to 10 carbon atoms which may be substituted by one or more fluorine atoms;
PFPE is $-(OC_4F_8)_a-(OC_3F_6)_b-(OC_2F_4)_c-(OCF_2)_d-$ wherein, a, b, c and d are each independently an integer of 0 to 90, the sum of a, b, c and d is 1 or more, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
$R^2$ is each independently a hydrogen atom or an inert monovalent organic group;

X is a hydroxyl group or OR$^4$;
R$^4$ is each independently at each occurrence a substituted or unsubstituted C$_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3,
wherein
a number average molecular weight of the perfluoro(poly)ether group containing silane compound is 3000 or more and 6000 or less,
polydispersity of g is more than 1.0 and less than 2.0, and
80 mol % or more of the perfluoro(poly)ether group containing silane compound contained in the surface-treating agent is a compound wherein g is 2 or more.

2. The surface-treating agent according to claim 1 wherein the number average molecular weight of the perfluoro(poly)ether group containing silane compound is 3000 or more and 5000 or less.

3. The surface-treating agent according to claim 1 wherein 90 mol % or more of the perfluoro(poly)ether group containing silane compound contained in the surface-treating agent is a compound wherein g is 2 or more.

4. The surface-treating agent according to claim 1 wherein 80 mol % or more of the perfluoro(poly)ether group containing silane compound contained in the surface-treating agent is the compound wherein g is 3 or more.

5. The surface-treating agent according to claim 1 wherein Rf is a perfluoroalkyl group having 1 to 10 carbon atoms.

6. The surface-treating agent according to claim 1 wherein PFPE is a group:

—(OCF$_2$CF$_2$CF$_2$)$_b$— wherein b is an integer of 1 or more and 40 or less.

7. The surface-treating agent according to claim 1 wherein PFPE is a group

—(OCF$_2$CF$_2$CF$_2$CF$_2$)$_a$—(OCF$_2$CF$_2$CF$_2$)$_b$—(OCF$_2$CF$_2$)$_c$—(OCF$_2$)$_d$— wherein a and b is each independently an integer of 0 to 30, c and d is each independently an integer of 1 to 90, and the occurrence order of the respective repeating units in parentheses with the subscript a, b, c or d is not limited in the formula.

8. The surface-treating agent according to claim 1, further comprising a solvent.

9. The surface-treating agent according to claim 1, further comprising one or more other components selected from the group consisting of a fluorine-containing oil, a silicone oil and a catalyst.

10. The surface-treating agent according to claim 9 wherein the fluorine-containing oil is one or more compounds of the formula (2):

Rf$^1$—(OC$_4$F$_8$)$_{a'}$—(OC$_3$F$_6$)$_{b'}$—(OC$_2$F$_4$)$_{c'}$—(OCF$_2$)$_{d'}$—Rf$^2$ (2)

wherein:
Rf$^1$ is an alkyl group having 1 to 16 carbon atoms which may be substituted by one or more fluorine atoms;
Rf$^2$ is an alkyl group having 1 to 16 carbon atoms which may be substituted by one or more fluorine atoms, a fluorine atom or a hydrogen atom; and
a', b', c' and d' are each independently an integer of 0 to 300, the sum of a', b', c' and d' is at least one, and the occurrence order of the respective repeating units in parentheses with the subscript a', b', c' or d' is not limited in the formula.

11. The surface-treating agent according to claim 9 wherein the fluorine-containing oil is one or more compounds of the formula (2a) or (2b):

Rf$^1$—(OCF$_2$CF$_2$CF$_2$)$_{b'}$—Rf$^2$ (2a)

Rf$^1$—(OCF$_2$CF$_2$CF$_2$CF$_2$)$_{a'}$—(OCF$_2$CF$_2$CF$_2$)$_{b'}$—(OCF$_2$CF$_2$)$_{c'}$—(OCF$_2$)$_{d'}$—Rf$^2$ (2b)

wherein:
Rf$^1$ is an alkyl group having 1 to 16 carbon atoms which may be substituted by one or more fluorine atoms;
Rf$^2$ is an alkyl group having 1 to 16 carbon atoms which may be substituted by one or more fluorine atoms, a fluorine atom or a hydrogen atom;
in the formula (2a), b' is an integer of 1 or more and 300 or less;
in the formula (2b), a' and b' is each independently an integer of 0 to 30, c' and d' is each independently an integer of 1 to 300, and the occurrence order of the respective repeating units in parentheses with the subscript a', b', c' or d' is not limited in the formula.

12. The surface-treating agent according to claim 1 which is used as an antifouling-coating agent or a waterproof-coating agent.

13. A pellet comprising the surface-treating agent according to claim 1.

14. An article comprising a base material and a layer which is formed on a surface of the base material from the surface-treating agent according to claim 1.

15. The article according to claim 14 wherein the base material is a glass.

16. The article according to claim 14 wherein the article is an optical member.

17. The article according to claim 14 wherein the article is a display.

18. A process for preparing a surface-treating agent comprising a perfluoro(poly)ether group containing silane compound of the formula (1):

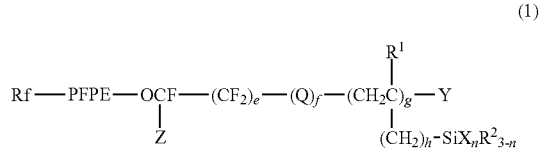

(1)

wherein:
Rf is an alkyl group having 1 to 10 carbon atoms which may be substituted by one or more fluorine atoms;
PFPE is —(OC$_4$F$_8$)$_a$—(OC$_3$F$_6$)$_b$—(OC$_2$F$_4$)$_c$—(OCF$_2$)$_d$— wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
R$^1$ is a hydrogen atom or an alkyl group having 1 to 22 carbon atoms;
R$^2$ is each independently a hydrogen atom or an inert monovalent organic group;
X is a hydroxyl group or OR$^4$;

$R^4$ is each independently at each occurrence a substituted or unsubstituted $C_{1-12}$ alkyl group;

Y is a hydrogen atom or a halogen atom;

Z is a fluorine atom or a fluoroalkyl group having 1 to 5 carbon atoms;

e is an integer from 0 to 3;

f is 0 or 1;

g is an integer from 1 to 10;

h is an integer from 0 to 3; and n is an integer from 1 to 3, wherein a number average molecular weight of the perfluoro(poly)ether group containing silane compound is 3000 or more and 6000 or less, polydispersity of g is more than 1.0 and less than 2.0, and 80 mol % or more of the perfluoro(poly)ether group containing silane compound contained in the surface-treating agent is a compound wherein g is 2 or more, comprising the steps of:

reacting a perfluoro(poly)ether compound of the formula (1a):

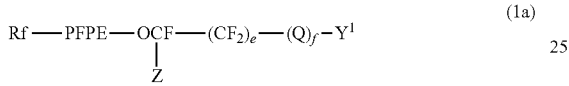

wherein Rf, PFPE, Q, Z, e and f are as defined for the formula (1) and $Y^1$ is a chlorine, an iodine or a bromine, with a reactive double bond containing silane compound of the formula (1b):

wherein $R^1$, $R^2$, h and n are as defined for the formula (1), and $X^1$ is a hydroxyl group, a hydrolyzable group or a halogen atom in a fluorine containing aromatic compound, and then, optionally following steps (a) and/or (b):

(a) when Y and $Y^1$ are different, converting $Y^1$ to Y; and (b) when X and $X^1$ are different, converting $X^1$ to X.

19. A process for preparing a surface-treating agent comprising a perfluoro(poly)ether group containing silane compound of the formula (1'):

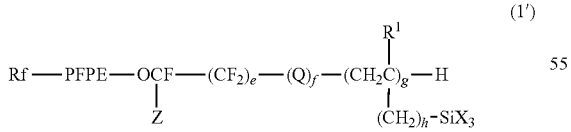

wherein:

Rf is an alkyl group having 1 to 10 carbon atoms which may be substituted by one or more fluorine atoms;

PFPE is

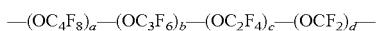

wherein, a, b, c and d are each independently an integer of 0 to 90, the sum of a, b, c and d is at least 1, and the occurrence order of the respective repeating units in parentheses with the subscript a, b, c or d is not limited in the formula;

Q is an oxygen atom or a divalent organic group;

$R^1$ is a hydrogen atom or an alkyl group having 1 to 22 carbon atoms;

X is a hydroxyl group or $OR^4$;

$R^4$ is each independently at each occurrence a substituted or unsubstituted $C_{1-12}$ alkyl group;

Z is a fluorine atom or a fluoroalkyl group having 1 to 5 carbon atoms;

e is an integer from 0 to 3;

f is 0 or 1;

g is an integer from 1 to 10; and h is an integer from 0 to 3;

wherein a number average molecular weight of the perfluoro(poly)ether group containing silane compound is 3000 or more and 6000 or less, polydispersity of g is more than 1.0 and less than 2.0, and 80 mol % or more of the perfluoro(poly)ether group containing silane compound contained in the surface-treating agent is a compound wherein g is 2 or more, comprising the steps of:

reacting a perfluoro(poly)ether compound of the formula (1a):

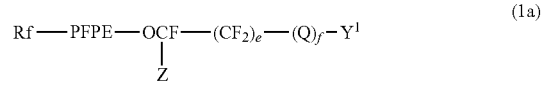

wherein Rf, PFPE, Q, Z, e and f are as defined above, and $Y^1$ is a chlorine, an iodine or a bromine, with a compound of the formula (1c):

wherein $R^1$ and h are as defined above, in a fluorine containing aromatic compound to obtain a compound of the formula (1d):

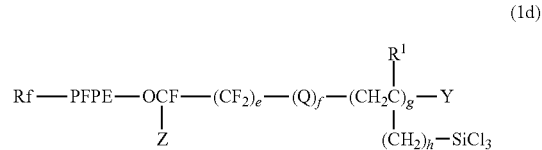

wherein Rf, PFPE, Q, $Y^1$, Z, $R^1$, e, f, g and h are as defined above, and then reacting the obtained compound with a compound of HX wherein X is as defined above.

20. The process according to claim 18 wherein the fluorine containing aromatic compound is selected from the group consisting of perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3- fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, 4-trifluoromethyl benzonitrile, aminobenzotrifluoride, and trifluoromethylaniline.

21. The process according to claim 18 wherein the fluorine containing aromatic compound is a fluorine containing aromatic compound having 0 to 3 debyes of polarizability.

22. The process according to claim 18 wherein the fluorine containing aromatic compound is selected from the group consisting of benzotrifluoride, difluorobenzonitrile, and bistrifluoromethyl benzonitrile.

23. A surface-treating agent comprising at least one perfluoro(poly)ether group containing silane compound of the formula (1):

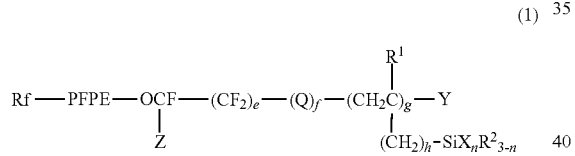

wherein:
Rf is an alkyl group having 1 to 10 carbon atoms which may be substituted by one or more fluorine atoms;
PFPE is

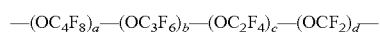

wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
$R^2$ is each independently a hydrogen atom or an inert monovalent organic group;
X is a hydroxyl group or $OR^4$;
$R^4$ is each independently at each occurrence a substituted or unsubstituted $C_{1-12}$ alkyl group;
Y is a hydrogen atom or a halogen atom;
Z is a fluorine atom or a fluoroalkyl group having 1 to 5 carbon atoms;
e is an integer from 0 to 3;
f is 0 or 1;
g is an integer from 1 to 10;
h is an integer from 0 to 3; and
n is an integer from 1 to 3,
wherein a number average molecular weight of the perfluoro(poly)ether group containing silane compound is 3000 or more and 6000 or less,
polydispersity of g is more than 1.0 and less than 2.0, and
80 mol % or more of the perfluoro(poly)ether group containing silane compound contained in the surface-treating agent is a compound wherein g is 2 or more,
wherein the perfluoro(poly)ether group containing silane compound of the formula (1) is prepared by reacting a perfluoro(poly)ether compound of the formula (1a):

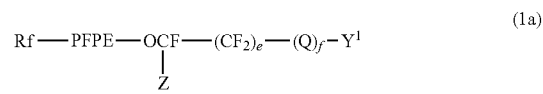

wherein Rf, PFPE, Q, Z, e and f are as defined for the formula (1) and $Y^1$ is a chlorine, an iodine or a bromine,
with a reactive double bond containing silane compound of the formula (1b):

wherein $R^1$, $R^2$, h and n are as defined for the formula (1), and $X^1$ is a hydroxyl group, a hydrolyzable group or a halogen atom
in a fluorine containing aromatic compound,
and then, optionally following steps (a) and/or (b):
(a) when Y and $Y^1$ are different, converting $Y^1$ to Y; and
(b) when X and $X^1$ are different, converting $X^1$ to X.

24. A surface-treating agent comprising at least one perfluoro(poly)ether group containing silane compound of the formula (1'):

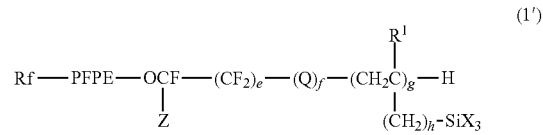

wherein:
Rf is an alkyl group having 1 to 10 carbon atoms which may be substituted by one or more fluorine atoms;
PFPE is

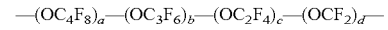

wherein a, b, c and d are each independently an integer of 0 to 90, the sum of a, b, c and d is at least 1, and the occurrence order of the respective repeating units in parentheses with the subscript a, b, c or d is not limited in the formula;
Q is an oxygen atom or a divalent organic group;
$R^1$ is a hydrogen atom or an alkyl group having 1 to 22 carbon atoms;
X is a hydroxyl group or $OR^4$;
$R^4$ is each independently at each occurrence a substituted or unsubstituted $C_{1-12}$ alkyl group;

Z is a fluorine atom or a fluoroalkyl group having 1 to 5 carbon atoms;
e is an integer from 0 to 3;
f is 0 or 1;
g is an integer from 1 to 10; and
h is an integer from 0 to 3;
wherein a number average molecular weight of the perfluoro(poly)ether group containing silane compound is 3000 or more and 6000 or less,
polydispersity of g is more than 1.0 and less than 2.0, and 80 mol % or more of the perfluoro(poly)ether group containing silane compound contained in the surface-treating agent is a compound wherein g is 2 or more,
wherein the perfluoro(poly)ether group containing silane compound of the formula (1') is prepared by reacting a perfluoro(poly)ether compound of the formula (1a):

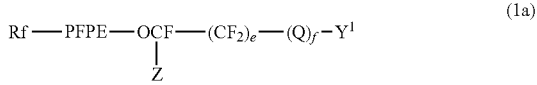

wherein Rf, PFPE, Q, Z, e and f are as defined above, and $Y^1$ is a chlorine, an iodine or a bromine,
with a compound of the formula (1c):

wherein $R^1$ and h are as defined above, in a fluorine containing aromatic compound to obtain a compound of the formula (1d):

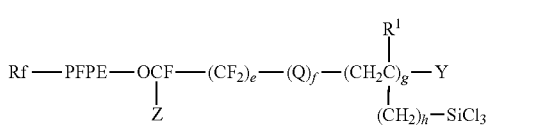

wherein Rf, PFPE, Q, $Y^1$, Z, $R^1$, e, f, g and h are as defined above, and then reacting the obtained compound with a compound of HX wherein X is as defined above.

25. The surface-treating agent according to claim 23 wherein the fluorine containing aromatic compound is selected from the group consisting of perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3-fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, 4-trifluoromethyl benzonitrile, aminobenzotrifluoride, and trifluoromethyl aniline.

26. The surface-treating agent according to claim 23 wherein the fluorine containing aromatic compound is a fluorine containing aromatic compound having 0 to 3 debyes of polarizability.

27. The surface-treating agent according to claim 23 wherein the fluorine containing aromatic compound is selected from the group consisting of benzotrifluoride, difluorobenzonitrile, and bistrifluoromethyl benzonitrile.

28. The process according to claim 19 wherein the fluorine containing aromatic compound is selected from the group consisting of perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3-fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, 4-trifluoromethyl benzonitrile, aminobenzotrifluoride, and trifluoromethylaniline.

29. The process according to claim 19 wherein the fluorine containing aromatic compound is a fluorine containing aromatic compound having 0 to 3 debyes of polarizability.

30. The process according to claim 19 wherein the fluorine containing aromatic compound is selected from the group consisting of benzotrifluoride, difluorobenzonitrile, and bistrifluoromethyl benzonitrile.

31. The surface-treating agent according to claim 24 wherein the fluorine containing aromatic compound is selected from the group consisting of perfluorobenzene, pentafluorobenzene, 1,2,3,4-tetrafluorobenzene, 1,2,3,5-tetrafluorobenzene, 1,2,4,5-tetrafluorobenzene, 1,2,3-trifluorobenzene, 1,2,4-trifluorobenzene, 1,3,5-trifluorobenzene, benzotrifluoride, fluorobenzene, 1-chloro-2-fluorobenzene, 1-chloro-3-fluorobenzene, 1-chloro-4-fluorobenzene, 2,6-dichlorofluorobenzene, 1-fluoro-3-(trifluoromethoxy)benzene, 1-fluoro-2,4-dinitrobenzene, 2,4-dimethoxy-1-fluorobenzene, 1-fluoro-4-nitrobenzene, 2-fluorotoluene, 3-fluorotoluene, 4-fluorotoluene, 3-fluorobenzotrifluoride, 1-chloro-2,4-difluorobenzene, 1-chloro-3,4-difluorobenzene, 1-chloro-3,5-difluorobenzene, 2-chloro-1,3-difluorobenzene, chloropentafluorobenzene, 2,4-dichlorofluorobenzene, 2,5-dichlorofluorobenzene, 2,6-dichlorofluorobenzene, 1,2-dichloro-4-fluorobenzene, 1,3-dichloro-5-fluorobenzene, 1,3-dichloro-2,4,6-trifluorobenzene, 3,4-difluorobenzonitrile, 3,5-difluorobenzonitrile, 3,4-difluoronitrobenzene, 1-ethoxy-2,3-difluorobenzene, 1,2-dicyano-4,5-difluorobenzene, 1-acetoxy-3-fluorobenzene, 1-acetoxy-4-fluorobenzene, 1-acetonyl-4-fluorobenzene, 2-fluoro-m-xylene, 3-fluoro-o-xylene, 4-fluoro-o-xylene, pentafluoroanisole, tetrafluorophthalonitrile, 2-trifluoromethylbenzal chloride, 3-trifluoromethylbenzal chloride, 4-trifluoromethylbenzal chloride, methyl 3-(trifluoromethyl)benzoate, difluorobenzonitrile, bistrifluoromethyl benzonitrile, 4-trifluoromethyl benzonitrile, aminobenzotrifluoride, and trifluoromethylaniline.

32. The surface-treating agent according to claim 24 wherein the fluorine containing aromatic compound is a fluorine containing aromatic compound having 0 to 3 debyes of polarizability.

33. The surface-treating agent according to claim 24 wherein the fluorine containing aromatic compound is selected from the group consisting of benzotrifluoride, difluorobenzonitrile, and bistrifluoromethyl benzonitrile.

* * * * *